March 4, 1969  C. E. LONG  3,430,736

SELF-ADJUSTING WEDGE-TYPE DISK BRAKE

Filed Sept. 25, 1967

INVENTOR.
CHARLES E. LONG

United States Patent Office 3,430,736
Patented Mar. 4, 1969

3,430,736
SELF ADJUSTING WEDGE-TYPE DISC BRAKE
Charles E. Long, P.O. Box 367, De Land, Fla. 32720
Filed Sept. 25, 1967, Ser. No. 670,213
U.S. Cl. 188—73          3 Claims
Int. Cl. F16d 55/00, 51/60, 65/38

ABSTRACT OF THE DISCLOSURE

A braking device having an inherent adjusting means with the brake shoes being wedge shaped and secured to an endless-sprocket driven chain. This device by the wedged shoes being tapered and carried by the chain automatically due to the shape of the shoes and guides takes up any wear that normally occurs and an arm attached to one of the sprockets is pulled by a brake cable attached to the arm in order to provide the necessary braking action.

---

This invention relates to friction-type brakes and more particularly to a brake having inherent self-adjusting elements.

It is therefore the main purpose of this invention to provide a self-adjusting brake that will have a pair of sprockets, one of which is attached to a lever arm, the lever arm being attached to a brake cable which when pulled will slide the brake shoe wedges which are attached to the chain against a brake shoe guide which acts against a disc.

Another object of this invention is to provide a self-adjusting brake in which the brake shoes are secured on opposite sides of an endless chain which is carried by the sprockets of the device.

Other objects of this invention are to provide a self-adjusting brake which is simple in design, inexpensive to manufacture, rugged in construction, easy to use and efficient in operation.

These and other objects will become readily evident upon a study of the following specifications together with the accompanying drawing wherein.

Figure 1:
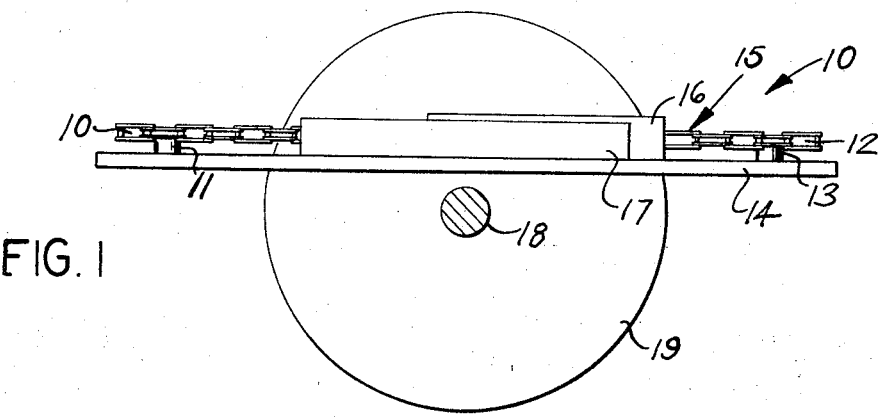
FIGURE 1 is a side view of the present invention shown in elevation.
Figure 2:
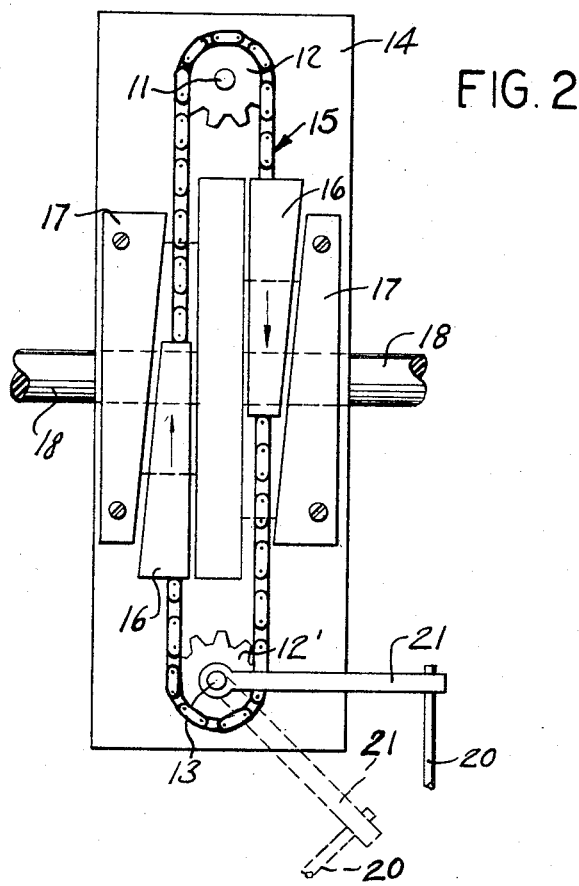
FIGURE 2 is a top plan view of FIGURE 1.

According to this invention, a self-adjusting brake 10 is provided with a shaft 11 to which is attached a rotatable sprocket 12 and a sprocket 12' and rotatably secured to a shaft 13. Shafts 11 and 13 are secured to plate 14 and an endless chain 15 is carried by sprockets 12 and 12' for a purpose which will hereinafter be described. A pair of brake shoe wedges 16 are secured to chain 15 in opposition to each other. A pair of spaced apart brake shoe guides 17 provide guide means for brake shoe wedges 16 thus enabling a braking action to occur upon the axle 18 by means of disk 19 being frictionally engaged with brake shoe wedges 16. A brake cable 20 secured to one end of arm 21 which is secured to sprocket 12' and arm 21 provides means of rotating sprocket 12' which will revolve the chain 15 and cause a braking action by means of the wedges 16 against the disk 19 upon axle 18. It shall be noted that self-adjusting brake 10 may be mounted in several ways (not shown).

In use, the wedges 16 when moved by arm 21 through the use of cable 20 are reversed so that the brake shoe wedges 16 are moved along the tapered brake shoe guides 17 thus forcing against the disk 19 that is secured to the axle 18 which will promote a steady braking action and a spring (not shown) may be attached to arm 21, secured to sprocket 12' thus enabling the releasing of brake 10.

While various changes may be made in the detailed construction of the present invention, it is understood that such changes will be within the spirit and scope of the invention.

What I now claim is:

1. A self adjusting brake device comprising a base plate, a pair of shafts and sprockets carried by said base plate providing movement of a pair of wedged shaped brake shoes having side faces, a pair of spaced apart brake shoe guides carried by said base plate providing guide means for braking element against each side of a disk secured to a shaft, and cable means carried by said device providing a means for actuating said device, said sprockets carried by said shafts secured to said base carrying an endless chain, said chain having secured to it said brake shoe wedges which form the braking action for said device, and said brake shoe wedges being tapered to conform to an angle of rake of said shoe guide members, and thus continued braking is efficiently effected as the shaped of said guide members and said wedge members automatically take up for wear.

2. The combination according to claim 1 wherein one side face of each said brake shoe wedge moved by said chain causes frictional engagement with a corresponding side surface of said disk carried by the shaft to be braked when the brake cable is pulled.

3. The combination according to claim 2 wherein braking against said disk by said brake shoe wedge members is accomplished when said cable is pulled which pivotably rotates one of the sprockets of said device and thus both of said sprockets rotate simultaneously to cause a smooth braking action against the disk.

References Cited

UNITED STATES PATENTS

| 569,476 | 10/1896 | Sauvage | 188—136 |
| 782,961 | 2/1905 | Haug | 188—73 |
| 3,207,267 | 9/1965 | Beuchle et al. | 188—73 |

FOREIGN PATENTS 1,466,399  12/1966  France.

GEORGE E. A. HALVOSA, *Primary Examiner.*

U.S. Cl. X.R.
188—72, 136, 196